United States Patent [19]

Hasegawa et al.

[11] Patent Number: 5,550,613
[45] Date of Patent: Aug. 27, 1996

[54] NEGATIVE CARRIER FOR PHOTOGRAPHIC PRINTER

[75] Inventors: Takeshi Hasegawa; Takashi Yamamoto, both of Kanagawa, Japan

[73] Assignee: Fuji Photo Film Co., Ltd., Kanagawa, Japan

[21] Appl. No.: 458,251

[22] Filed: Jun. 2, 1995

[30] Foreign Application Priority Data

Sep. 8, 1994 [JP] Japan .................................. 6-214475

[51] Int. Cl.⁶ .................................................. G03B 27/52
[52] U.S. Cl. ................................ 355/41; 355/40; 355/75
[58] Field of Search .............................. 355/40, 41, 75, 355/71; 250/221, 221.1, 559.1, 55.02; 271/3.15, 3.17

[56] References Cited

U.S. PATENT DOCUMENTS

| | | | |
|---|---|---|---|
| 3,835,332 | 9/1974 | Bridges | 250/563 |
| 4,864,149 | 9/1989 | Matsumoto | 250/561 |
| 5,071,514 | 12/1991 | Francis | 162/259 |
| 5,119,126 | 6/1992 | Tokuda | 355/41 |
| 5,352,900 | 10/1994 | Dragon et al. | 250/561 |

*Primary Examiner*—Arthur T. Grimley
*Assistant Examiner*—David A. Lane
*Attorney, Agent, or Firm*—Sughrue, Mion, Zinn, Macpeak & Seas

[57] ABSTRACT

A negative carrier for a photographic printer, which is installed on a photographic printer for print-exposing an image on a negative film onto a photosensitive material, and which effects the positioning of the negative film during print-exposure of the photosensitive material. The negative carrier includes a sensor disposed in a transporting passage of the negative film so as to detect information concerning the negative film; and a controlling device for determining the presence or absence of the negative film over the sensor on the basis of a detection signal from said sensor, and for calibrating the sensor if it is determined that the negative film is absent. The sensor is prevented from being calibrated erroneously in a state in which the negative film is present over the sensor, thereby facilitating the calibration of the sensor.

20 Claims, 7 Drawing Sheets

NEGATIVE CARRIER FOR PHOTOGRAPHIC PRINTER

BACKGROUND OF THE INVENTION

1. Field of the Invention

The present invention relates to an apparatus for a negative carrier for a photographic printer for positioning a negative film when an image on the negative film is printed on a photosensitive material, and is applicable to, for instance, a printer processor in which a photographic printer and a processor are combined.

2. Description of the Related Art

A printer processor, which is popularly known as a mini lab, is installed in a DPE shop (the "DPE shop" refers to a shop where photographic films are commercially processed) or the like. A printer section for print-exposing an image recorded on a negative film onto photographic printing paper and a processor section for processing the printing paper subjected to print-exposure are integrated in the printer processor. By simply setting the elongated printing paper in the printer processor, the printer processor is capable of automatically transporting and processing the printing paper in the printer section and the processor section. In the printer section of the printer processor, the image on the negative film is printed onto the printing paper after being enlarged to a selected fixed size, and the printing paper with images printed thereon is consecutively transported to the processor section where it is developed and finished as a photographic print.

When the image on the negative film is exposed and printed onto the printing paper, from the viewpoint of the operating efficiency the negative film is conventionally subjected to print-exposure while being automatically transported in a negative carrier for positioning the negative film on a worktable of the printer processor.

For this reason, when the negative film is subjected to exposure processing while the negative film is being transported in the negative carrier, it is necessary to provide in the negative carrier sensors for detecting the presence of the negative film in the negative carrier, the presence of an image frame on the negative film, and other information concerning the image frame, such as sensors for detecting a leading end, perforations, a spliced portion, an image plane, a frame number code (FNC), and a DX code. Each of such sensors is comprised of a light-emitting element, such as an LED, and a light-receiving element for receiving light from the light-emitting element. However, since the amount of light emitted from the light-emitting element declines or the sensitivity of the light-receiving element changes over time, it has been necessary to periodically calibrate the sensors for detecting the items of information concerning the negative film.

However, if a means for automatically calibrating the sensors is merely provided, there is a possibility of erroneously calibrating the sensors in a state in which the negative film is located over the sensors, thereby making it impossible to calibrate the sensors properly. Accordingly, since the calibration of the sensors is conventionally carried out by expert personnel for maintaining the negative carrier periodically, there has been a drawback in that the calibration of the sensors is troublesome.

SUMMARY OF THE INVENTION

In view of the above-described circumstances, it is an object of the present invention to provide a negative carrier for a photographic printer which facilitates the calibration of sensors concerning the negative film.

To this end, in accordance with a first aspect of the present invention, there is provided a negative carrier for a photographic printer, which is installed on a photographic printer for print-exposing an image on a negative film onto a photosensitive material, and which effects the positioning of the negative film during print-exposure of the photosensitive material, comprising: a sensor disposed in a transporting passage of the negative film so as to detect information concerning the negative film; and a controlling device for determining one of the presence and absence of the negative film over the sensor on the basis of a detection signal from the sensor, and for calibrating the sensor if it is determined that the negative film is absent.

In accordance with a second aspect of the present invention, there is provided a negative carrier for a photographic printer, which is installed on a photographic printer for print-exposing an image on a negative film onto a photosensitive material, and which effects the positioning of the negative film during print-exposure of the photosensitive material, comprising: a transporting device for transporting the negative film; a sensor disposed in a transporting passage of the negative film so as to detect information concerning the negative film; and a controlling device which determines one of the presence and absence of the negative film over the sensor on the basis of a detection signal from the sensor and, upon determining that the negative film is absent, calibrates the sensor, whereas, upon determining that the negative film is present, the controlling device controls the transporting device so as to discharge the negative film from over the sensor, and calibrates the sensor after the discharge of the negative film.

In accordance with a third aspect of the present invention, there is provided a negative carrier for a photographic printer, which is installed on a photographic printer for print-exposing an image on a negative film onto a photosensitive material, and which effects the positioning of the negative film during print-exposure of the photosensitive material, comprising: a transport roller disposed in a transporting passage of the negative film in such a manner as to be rotatable so as to transport the negative film; a driving device for driving the transport roller; a sensor disposed in the transporting passage of the negative film so as to detect information concerning the negative film; and a controlling device which, when the negative carrier is electrically connected to the photographic printer and is installed on the photographic printer, determines one of the presence and absence of the negative film over the sensor on the basis of a detection signal from the sensor and, upon determining that the negative film is absent, calibrates the sensor, whereas, upon determining that the negative film is present, the controlling device controls the driving device so as to discharge the negative film from over the sensor by means of the transport roller, and calibrates the sensor after the discharge of the negative film.

With the negative carrier for a photographic printer in accordance with the first aspect of the present invention, the negative carrier, which is installed on the photographic printer for print-exposing an image on the negative film onto the photosensitive material, positions the negative film. Subsequently, the sensor disposed in the transporting passage of the negative film detects information concerning the negative film. If it is detected by the sensor that the negative film is absent over the sensor, the controller calibrates the sensor. Accordingly, the sensor is prevented from being calibrated erroneously in a state in which the negative film is present over the sensor, thereby facilitating the calibration of the sensor.

With the negative carrier for a photographic printer in accordance with the second aspect of the present invention, the controlling device determines the presence or absence of the negative film over the sensor on the basis of a detection signal from the sensor and, upon determining that the negative film is absent, calibrates the sensor, whereas, upon determining that the negative film is present, the controlling device controls the transporting device so as to discharge the negative film from over the sensor, and calibrates the sensor after the discharge of the negative film. Accordingly, the sensor is prevented from being calibrated erroneously in a state in which the negative film is present over the sensor, thereby facilitating the calibration of the sensor.

With the negative carrier for a photographic printer in accordance with the third aspect of the present invention, the drive roller which is rotatively driven by the driving device transports the negative film, and is stopped during print-exposure to position the negative film.

In addition, when the negative carrier is electrically connected to the photographic printer and is reinstalled on the photographic printer, if it is detected by the sensor that the negative film is present over the sensor, the controlling device controls the operation of the driving device so as to discharge the negative film from over the sensor by means of the transport roller, and calibrates the sensor after the discharge of the negative film. Accordingly, in the same way as in the first aspect of the present invention, the sensor is prevented from being calibrated erroneously in a state in which the negative film is present over the sensor, thereby facilitating the calibration of the sensor.

The above and other objects, features and advantages of the present invention will become more apparent from the following detailed description of the invention when read in conjunction with the accompanying drawings.

DESCRIPTION OF THE PREFERRED EMBODIMENT

FIGS. 1 to 7 show an embodiment of a negative carrier for a photographic printer in accordance with the present invention and a printer processor in which the negative carrier is installed. A description will be given of the embodiment of the present invention with reference to these drawings.

Figure 1:
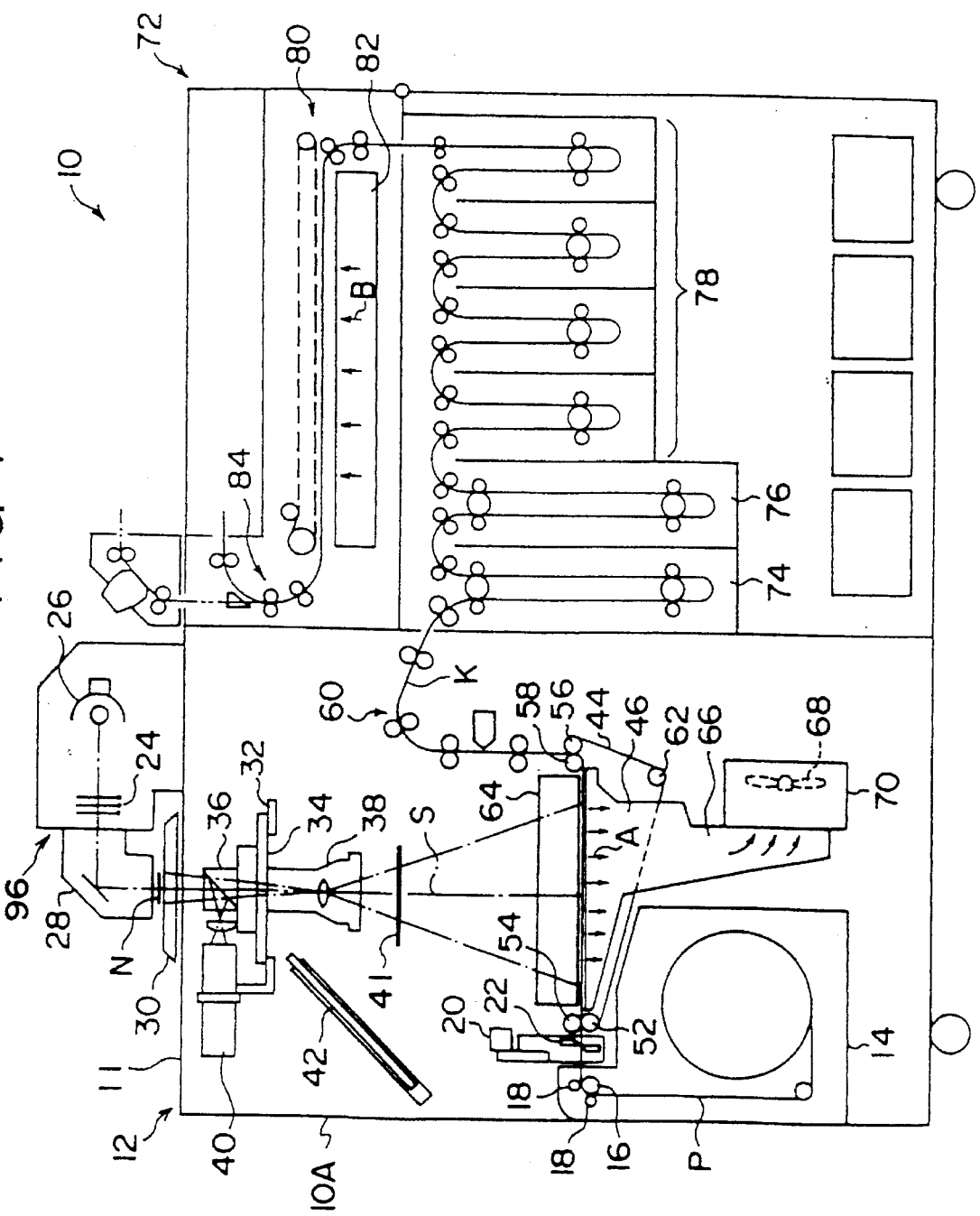
FIG. 1 is a schematic diagram illustrating a printer processor which is used in an embodiment of the present invention.

FIG. 1 schematically shows a printer processor 10 which is a photographic printer concerning the embodiment of the present invention. A photographic printing section 12 constituting a printer section of the printer processor 10 has a structure in which a paper magazine 14 with photographic printing paper P accommodated therein can be loaded in the photographic printing section 12.

A drive roller 16, around which a leading end portion of the printing paper P is wound, is rotatably supported on the upper left side of the paper magazine in FIG. 1. The drive roller 16 rotates by receiving a driving force of an unillustrated motor in the photographic printing section 12. A pair of nip rollers 18 are disposed at a position opposing the drive roller 16 with the printing paper P placed therebetween. For this reason, the drive roller 16 nips the printing paper P between the same and the nip rollers 18, and feeds the printing paper P into the photographic printing section 12.

On the other hand, a cutter 22, which is comprised of a pair of upper and lower blades and the blades are moved by a motor 20, is installed in the photographic printing section 12, and the printing paper P fed out from the paper magazine 14 is cut instantly by the cutter 22.

A support table 46 whose upper surface is formed in such a manner as to extend horizontally (in the left-and-right direction in FIG. 1) is disposed on the downstream side in the traveling direction of the printing paper P, i.e., on the right-hand side of the cutter 22 in FIG. 1. A winding roller 52, around which an endless belt 44 is wound, is disposed between the support table 46 and the cutter 22 such that its axial direction extends in a horizontal direction (in a direction perpendicular to the plane of FIG. 1). In addition, a nip roller 54 for nipping the endless belt 44 between the same and the winding roller 52 is disposed on the winding roller 52.

A guide roller 56, around which the endless belt 44 is wound, is located downstream of the support table 46 in the traveling direction of the printing paper P. A pressing roller 58 whose lower peripheral portion has substantially the same height as the upper peripheral portion of the winding roller 52 is disposed at a position adjacent to the guide roller 56. This pressing roller 58 presses the outer periphery of the endless belt 44.

That is, as shown in FIG. 1, this portion of the endless belt 44 is formed in an S-shape. Further, the endless belt 44 is wound around a tension roller 62 on the lower side of the guide roller 56, thereby forming a path of movement which is shaped in the form of an inverted triangle. The guide roller 56 is rotatively driven by the driving force of an unillustrated motor, and rotates the endless belt 44 clockwise as viewed in FIG. 1.

Meanwhile, a multiplicity of small holes (not shown) are formed in the endless belt 44 over an entire area thereof. In correspondence with the small holes in the endless belt 44, a multiplicity of holes (not shown) are formed in an upper surface of the support table 46 where a portion of the endless belt 44 is placed. The interior of the support table 46 is formed in a hollow shape, and a pair of communicating ducts 66 (only one is shown in the drawing) formed in correspondence with transverse ends of the endless belt 44 are connected to the support table 46. These communicating ducts 66 detour the portion of the endless belt 44 passing below the support table 46, reaches the lower side of the endless belt 44, and is connected to a fan box 70 provided with a suction fan 68.

On the other hand, as shown in FIG. 1, an easel device 64 is provided over the endless belt 44 moving on the support table 46, so as to cover the periphery of the printing paper P by unillustrated movable pieces provided in the easel device 64 in a case where an image requiring a border is printed onto the printing paper P.

An outer frame of the printer processor 10 is constituted by a casing 10A, and particularly an upper surface portion of the photographic printing section 12 is formed by a worktable 11. Arranged above the worktable 11 are a CC filter 24, which is constituted by a set of C, M and Y filter elements which are movable so as to vary the amount of each filter element inserted into the optical path, and a light source device 96 having a light source 26 for emitting a light beam. Further, a diffusing box 28 for diffusing the light from the light source device 96 is disposed at a position above the worktable 11 and immediately above the easel device 64.

Accordingly, after the light beam emitted from the light source 26 located adjacent to the CC filter 24 is transmitted through the CC filter 24, the light beam is reflected downward while being diffused by the diffusing box 28. The light beam is then transmitted through a negative film N on a negative carrier 30 placed on the upper surface of the worktable 11.

Here, a detailed description will be given of the negative carrier 30 in accordance with this embodiment.

Figure 4:
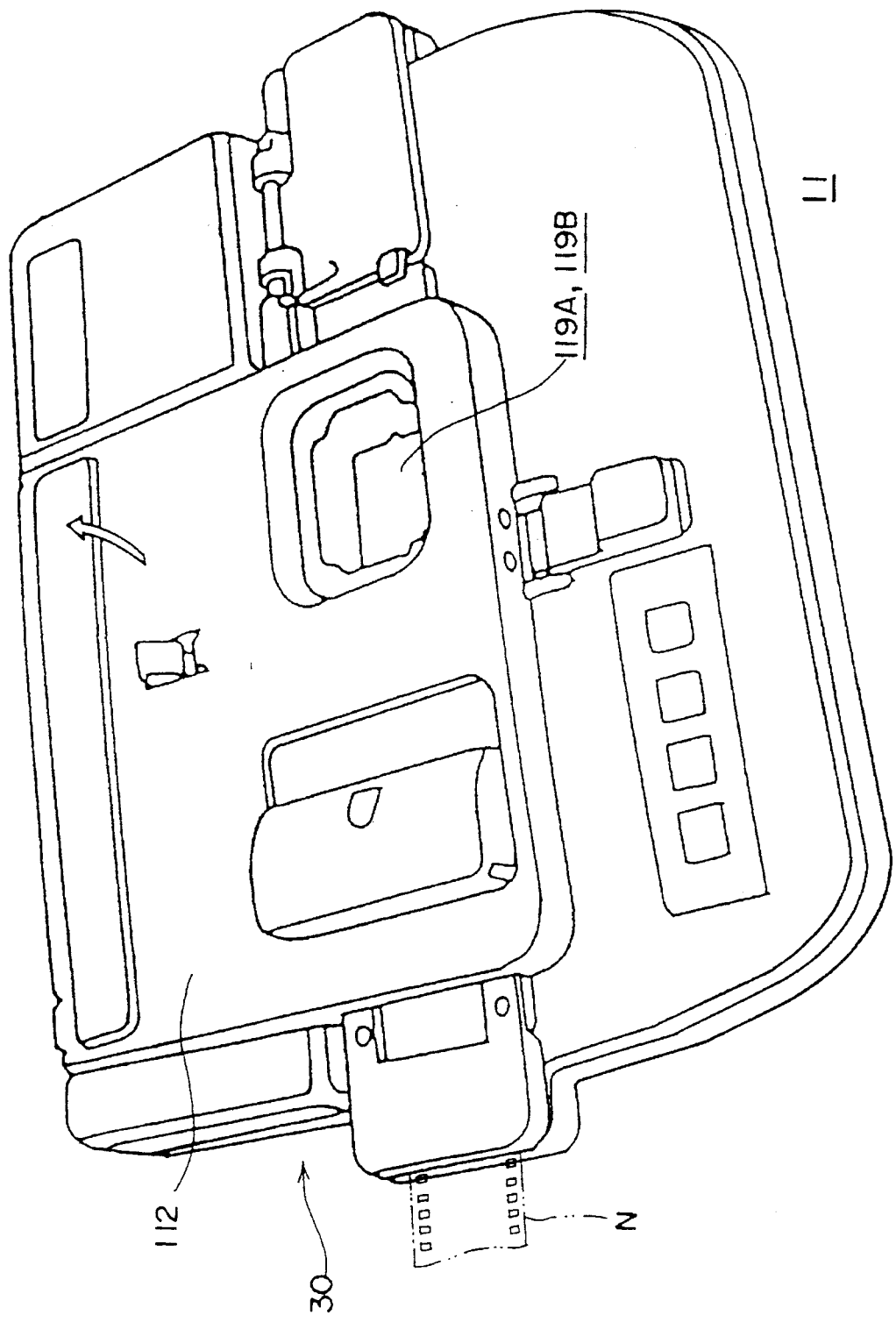
FIG. 4 is a perspective view of the negative carrier in accordance with the embodiment of the present invention.
Figure 5:
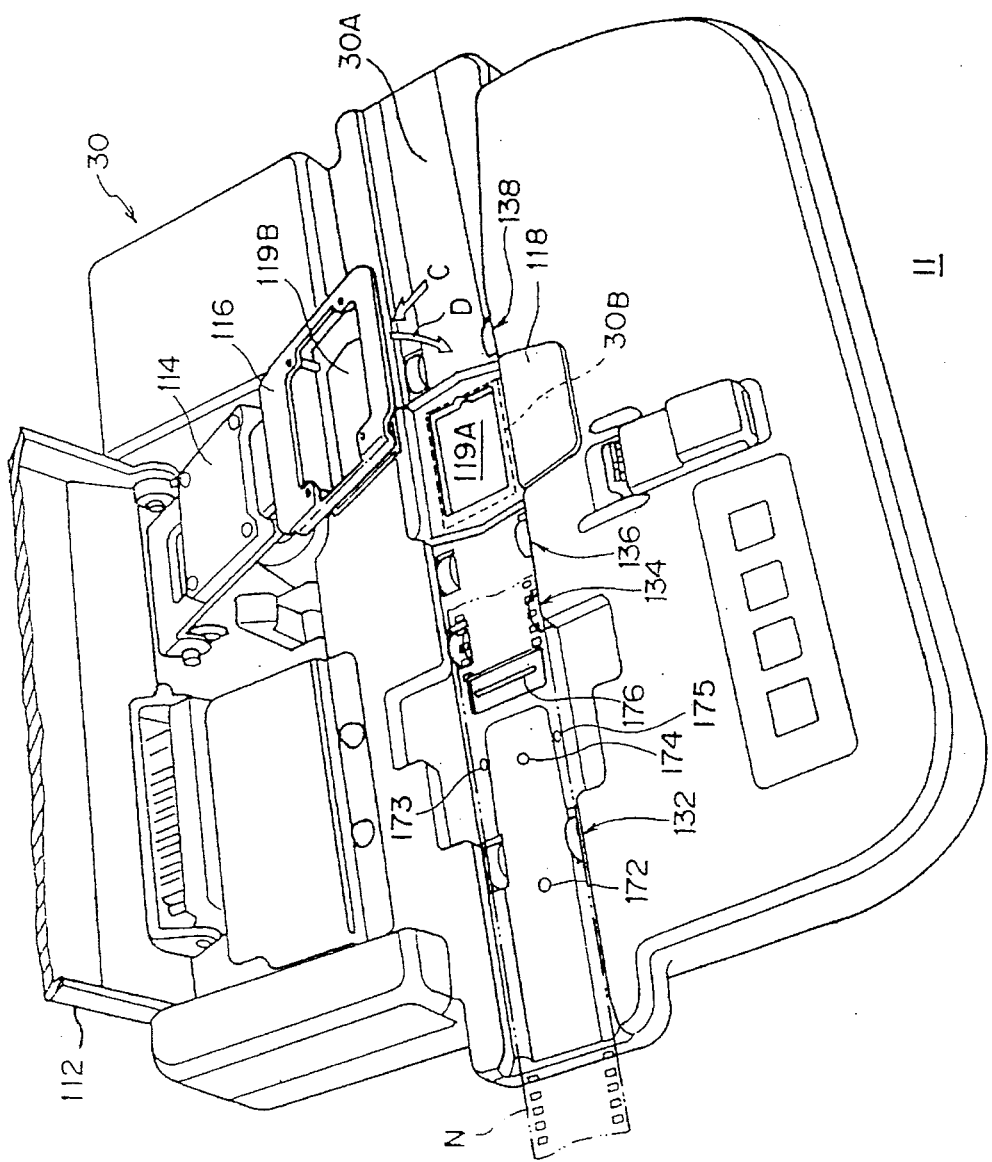
FIG. 5 is a perspective view of the negative carrier in accordance with the embodiment of the present invention, and illustrates a state in which a cover is open.

As shown in FIG. 4, an openable cover 112 is attached to the negative carrier 30 on the worktable 11. If this cover 112 is opened as shown in FIG. 5, a negative-film passage portion 30A appears which is formed in the shape of a groove and constitutes a traveling path of the negative film N. A pressure contact plate (also called an upper negative mask) 116, which is fitted to a holder 114 by being inserted into it in the direction of arrow C, is located below the cover 112, and the holder 114 is attached rotatably to the negative carrier 30. Also located below the cover 112 is a mask (also called a lower negative mask) 118 which is disposed over the negative-film passage portion 30A. A window 119A and a window 119B, which have areas slightly larger than a full-size image frame, i.e., a maximum image plane size of the negative film N, are formed in the mask 119 and the pressure contact plate 116, respectively.

A rectangular opening 30B which is larger than the window 119A of the mask 118 and the window 119B of the pressure contact plate 116 is formed at the position of the negative carrier 30 where the mask 118 is fitted. In addition, an unillustrated pair of mask pieces for changing the opening in correspondence with the image frame size by a variable mask mechanism (not shown are disposed below the opening 30B.

Accordingly, if the holder 114 is rotated together with the pressure contact plate 116 in the direction of arrow D to allow the pressure contact plate 116 to be brought into contact with the mask 118, the light beam emitted from the light source 26 is transmitted through the negative film N located between the window 119A of the mask 118 and the window 119B of the pressure contact plate 116. Further, the light beam is partially shielded by the pair of mask pieces, and the light beam which is thus reduced to only a necessary portion in correspondence with the image frame size is directed to the aforementioned easel device 64.

Figure 6:
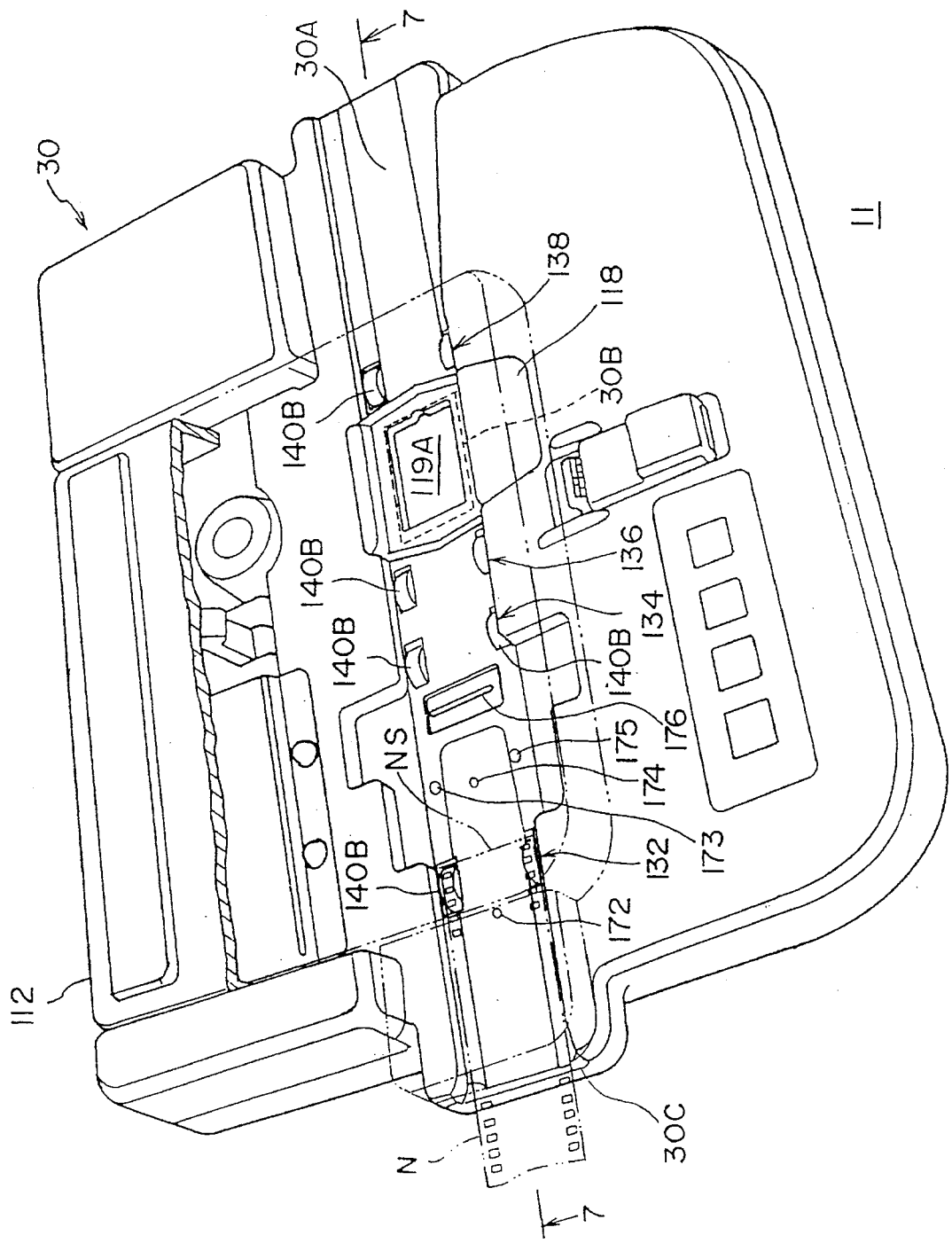
FIG. 6 is a perspective view of the negative carrier in accordance with the embodiment of the present invention, and illustrates a state in which a leading end of the negative film is nipped by a first pair of transport rollers (a holder and a pressure contact plate being omitted)
Figure 7:
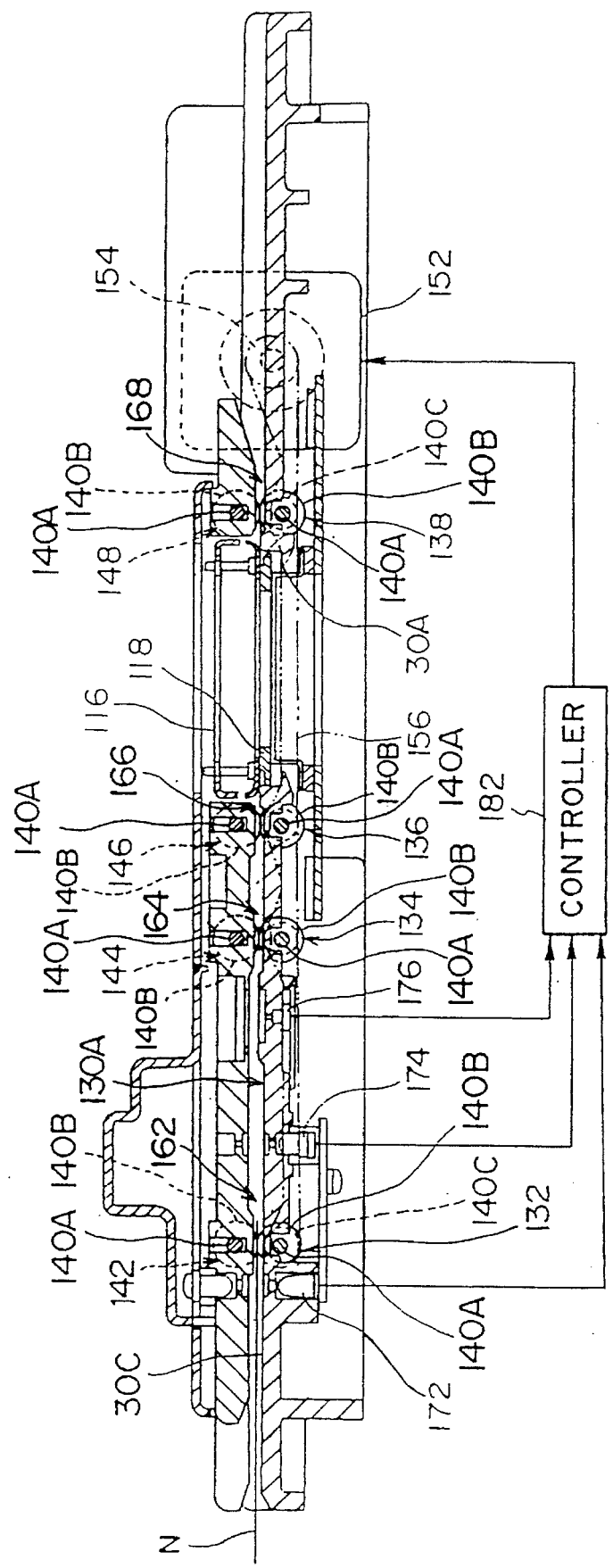
FIG. 7 is a cross-sectional view taken along line 7—7 in FIG. 6.

Meanwhile, as shown in FIGS. 5, 6, and 7, three rollers 132, 134, and 136 are rotatably supported in the negative-film passage portion 30A and upstream of the mask 118 in the traveling direction of the negative film N. Each of the three rollers 132, 134, and 136 extends in the transverse direction of the negative film N and is formed by fixing a pair of rubber rings 140B serving as abutment portions to a roller shaft 140A at positions close to opposite ends thereof. The mask 118 is disposed above an exposing position at which the negative film N is positioned for effecting print-exposure.

In addition, a drive roller 138 is rotatably supported in the negative-film passage portion 30A and downstream of the mask 118 in the traveling direction of the negative film N. The drive roller 138 similarly extends in the transverse direction of the negative film N and is formed by fixing a pair of rubber rings 140B serving as abutment portions to a roller shaft 140A at positions close to opposite ends thereof.

As shown in FIG. 7, a motor 152 serving as a driving source is fixed in the negative carrier 30, and a pulley 154 around which an endless timing belt 156 is wound is attached to the motor 152. The timing belt 156 is also wound around pulleys 140C attached to the drive rollers 132, 134, 136, and 138.

For this reason, as the motor 152 is rotatively driven, the four drive rollers 132, 134, 136, and 138 are rotated by means of the pulley 154, the timing belt 156, the pulleys 140C, and the like.

Driven rollers 142, 144, 146, and 148, each formed by fixing a pair of rubber rings 140B to a roller shaft 140A, are rotatably supported at positions on the underside of the cover 112 opposing the four drive rollers 132, 134, 136, and 138.

Accordingly, if the cover 112 is closed, the four drive rollers 132, 134, 136, and 138 in the negative-film passage section 30A and the four driven rollers 142, 144, 146, and 148 supported by the cover 112 are capable of nipping the negative film N between them and transport the negative film N between them.

Namely, the drive roller 132 and the driven roller 142 constitute a first pair of transport rollers 162 capable of nipping the negative film N; the drive roller 134 and the driven roller 144 similarly constitute a second pair of transport rollers 164; the drive roller 136 and the driven roller 146 similarly constitute a third pair of transport rollers 166; and the drive roller 138 and the driven roller 148 similarly constitute a fourth pair of transport rollers 168.

Meanwhile, a leading-end detecting sensor 172, which is constituted by a light-emitting element and a light-receiving element (neither are shown) for detecting a leading end of the negative film N, is disposed along the negative-film passage portion 30A upstream of the first pair of transport rollers 162 in the traveling direction of the negative film N. In addition, FNC and DX code sensors (hereafter referred to as the code sensors) 173 and 175 and a splice detecting sensor 174, each of which is similarly constituted by a light-emitting element and a light-receiving element (neither are shown), are arranged along the negative-film passage section 30A between the first pair of transport rollers 162 and the second pair of transport rollers 164. Further, an image-plane detecting sensor 176, which is similarly constituted by a light-emitting element and a light-receiving element (neither are shown) for detecting the presence of an image within an image frame, is disposed along the negative-film passage portion 30A between the first pair of transport rollers 162 and the second pair of transport rollers 164 and upstream of the splice detecting sensor 174 in the traveling direction of the negative film N.

The aforementioned sensors 172, 173, 174, 175, and 176 are electrically connected to the motor 152 and a controller 182 which is a controlling device. Further, the controller 182 is electrically connected to an unillustrated start key so that the motor 152 will be rotatively driven by the operation of the start key. The controller 182 is also electrically connected to an unillustrated sensor calibration key for calibrating these sensors 172, 173, 174, 175, and 176.

Accordingly, if the start key is operated, and the motor 152 rotates, the pairs of transport rollers, 162, 164, 166, and 168 rotate to start transporting the negative film N. At this time, the controller 182 controls the operation and stopping of the motor 152 on the basis of detection signals from the sensors 172,.73, 174, 175, and 176.

In addition, when the sensor calibration key is operated, the light-emitting elements of the sensors 172, 173, 174, 175, and 176 emit light in response to a command from the controller 182 and the light-receiving elements receive the light from the light-emitting elements, so as to determine whether the sensitivities of the sensors 172, 173, 174, 175, and 176 fall within predetermined ranges of values, respectively. On the basis of this determination, the sensitivities of the light-receiving elements, for instance, are automatically corrected so as to fall within the predetermined ranges of values, thereby calibrating the sensors.

The printer processor 10 and the negative carrier 30 are respectively provided with connectors, and if these connectors are electrically connected to each other, electric power is supplied to the negative carrier 30, so that the motor 152 in the negative carrier 30 can be rotatively driven. Additionally, a setting is provided for the controller 182 such that the sensors can be calibrated in the same way as by the operation of the sensor calibration key when electric power is supplied to the negative carrier 30 by the placement of the negative carrier 30 on the worktable 11.

Figure 2:
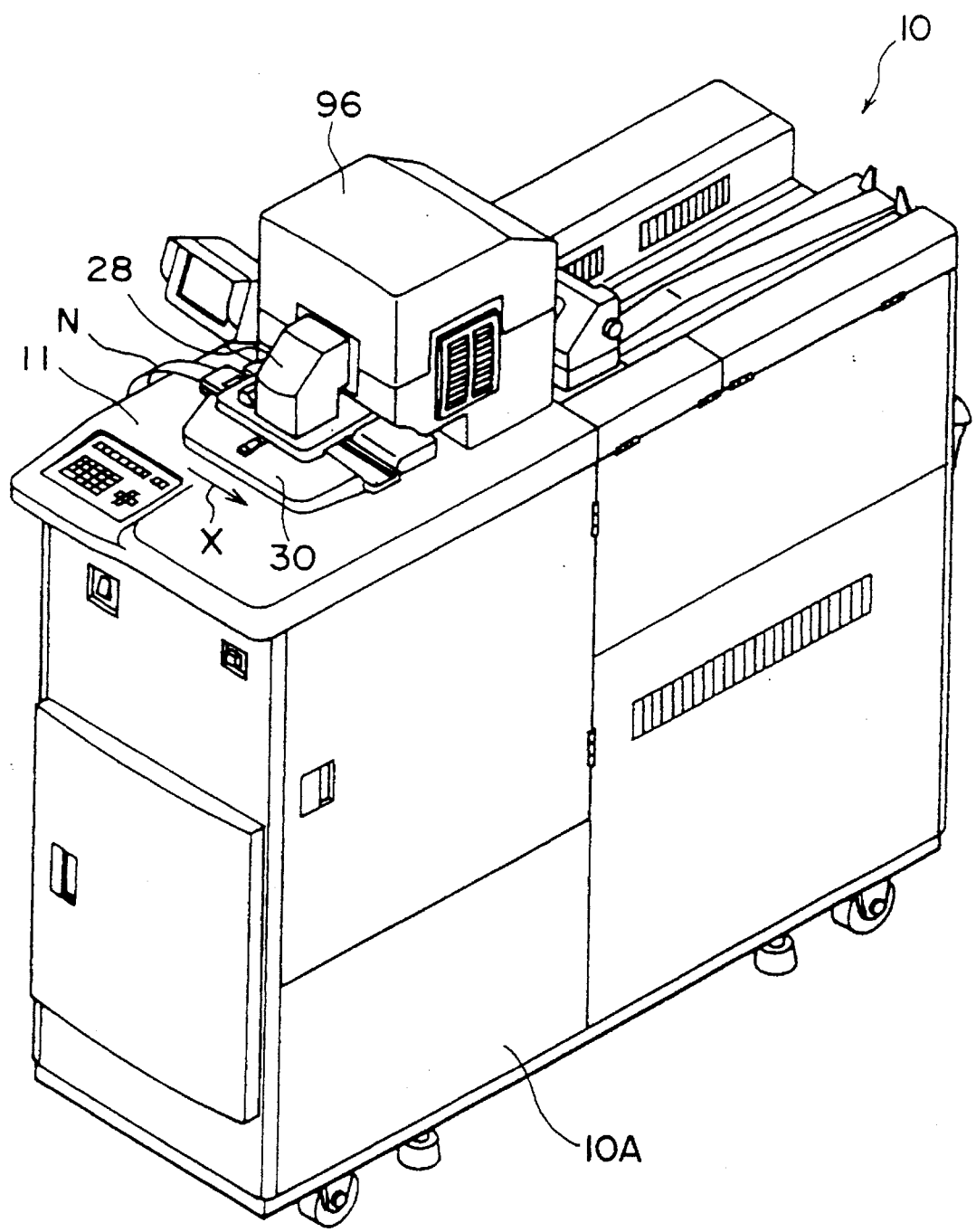
FIG. 2 is a perspective view illustrating the printer processor used in the embodiment of the present invention, and illustrates a negative carrier disposed in such a manner as to feed a negative film in the transverse direction of the printer processor.
Figure 3:
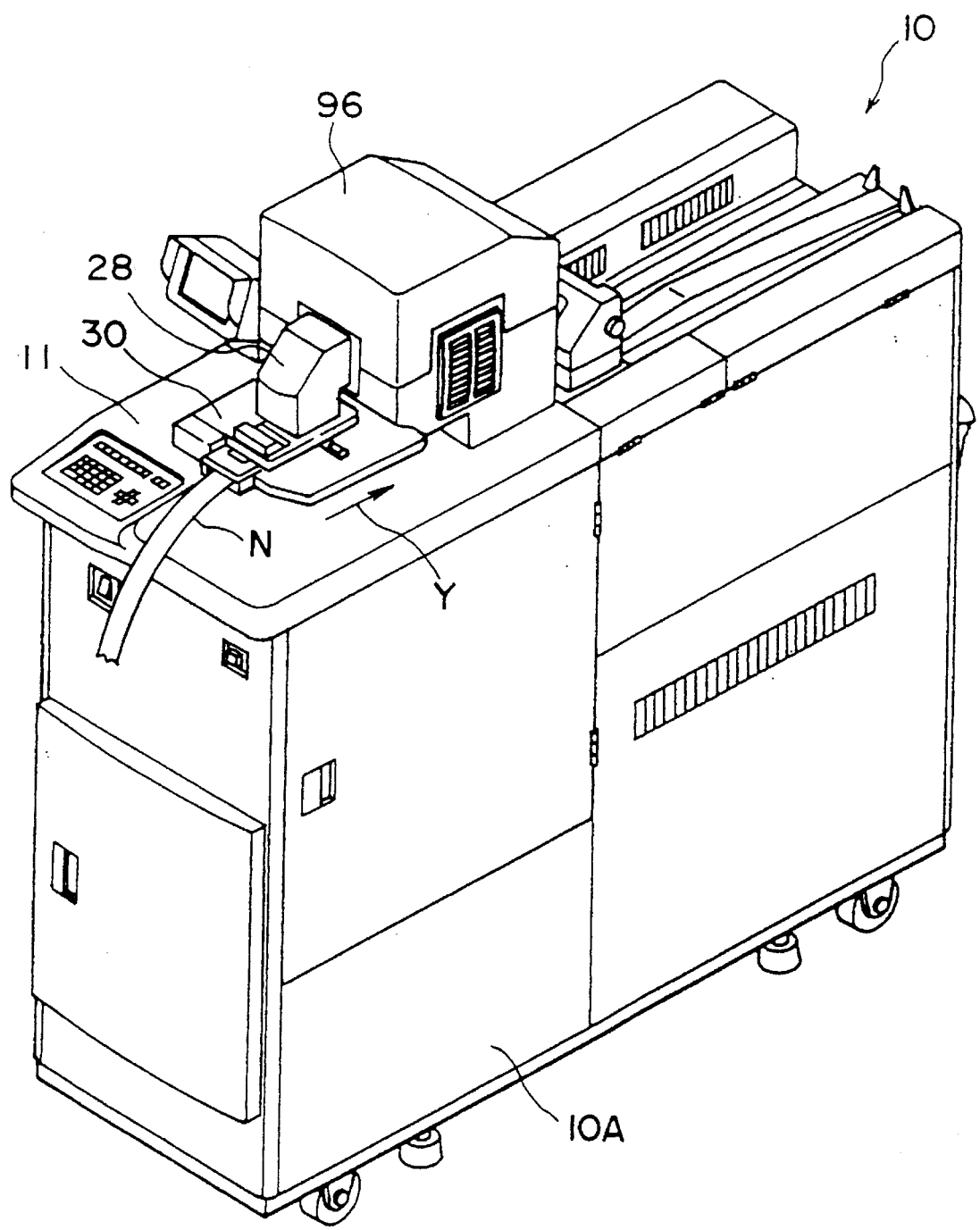
FIG. 3 is a perspective view illustrating the printer processor used in the embodiment of the present invention, and illustrates the negative carrier disposed in such a manner as to feed the negative film in the longitudinal direction of the printer processor.

On the other hand, as for the arrangement of the negative carrier 30 on the worktable 11, it is conceivable to adopt two feeding systems, i.e., a transverse feeding system in which, as shown in FIG. 2, the direction of arrow X is set as the direction in which the negative film N is transported instead of the negative film N being transported toward the light source device 96, and a longitudinal feeding system in which, as shown in FIG. 3, the direction of arrow Y in which the negative film N is transported toward the light source device 96 is set as the direction in which the negative film N is transported.

Meanwhile, as shown in FIG. 1, a pair of guide rails 32 is provided in the photographic printing section 12 immediately below the negative carrier 30. A support plate 34 is supported by the guide rails 32 in such a manner as to be movable in a horizontal direction (in a direction perpendicular to the plane of the drawing in FIG. 1). A prism 36 and a zoom lens 38 are respectively attached to upper and lower sides of the support plate 34 such that the prism 36 and the zoom lens 38 are aligned with the optical axis S of the light beam.

Accordingly, the light beam, after being transmitted through the negative film N on the negative carrier 30 and converted into an exposing light beam, is transmitted through the prism 36, and then passes through the zoom lens 38 which is capable of changing the magnification for enlargement. The light beam then forms an image on the negative film N onto the printing paper P located below the easel device 64.

A density measuring instrument 40, which is comprised of, for example, a color filter and an optical sensor such as a CCD so as to measure the density of the negative film N, is disposed in the photographic printing section 12. The light beam reflected in a horizontal direction by the prism 36 is directed into the density measuring instrument 40. The density measuring instrument 40 is electrically connected to the unillustrated controller, and is used to set an exposure correction value during print-exposure on the basis of data measured by the density measuring instrument 40 and data keyed in by the operator.

Furthermore, a black shutter 41 is provided in the optical path between the zoom lens 38 and the easel device 64. The black shutter 41 effects print-exposure for a predetermined time duration by using the light whose color and intensity have been adjusted by the CC filter 24 and which has been transmitted through the negative film N.

Since the photographic printing section 12 is provided with the above-described structure, after the printing paper P fed out from the paper magazine 14 is cut to a predetermined length by the cutter 22, the printing paper P is placed on the endless belt 44, and is transported to the image printing position which is a position on the optical axis S of the exposing light beam. As the exposing light beam from the light source 26 side reaches the printing paper P through the prism 36, the zoom lens 38, and the like, and the black shutter 42 is opened for a predetermined time duration, the image recorded on the negative film N is exposed onto the printing paper P, and the portion where the image is exposed becomes the image portion.

At this time, the air inside the support table 46 is drawn in the transverse direction of the endless belt 44 from inside the loop of the endless belt 44 through the communicating ducts 66, and is sucked by the suction fan 68 and is blown to the outside. Consequently, the interior of the support table 46 is held under negative pressure. This negative pressure is transmitted to the printing paper P on the endless belt 44 through the holes in the support table 46 and the small holes in the endless belt 44, so that the printing paper P is sucked onto the endless belt 44, as shown by arrows A. For this reason, since the printing paper P is not only carried on the endless belt 44, but also sucked toward the endless belt 44, the printing paper P is transported reliably by the endless belt 44, and is placed in a horizontal state at the image printing position.

Further, the printing paper P for which the print-exposure of the image has been completed is nipped by the guide roller 56 and the pressing roller, and is fed out in a vertical direction after its traveling direction is changed from the horizontal direction to the vertical direction. Subsequently, as the traveling direction of the printing paper P is indicated by a path K, the printing paper P is transported to a processor section 72 for effecting various processing, including development, bleach-fixing, washing, and drying via a transport passage 60 formed by a plurality of pairs of rollers.

This completes the print-exposure for one image frame portion of the negative film N. As this process is repeated, the printing paper P subjected to print exposure processing is transported consecutively to the processor section 72.

A development solution is stored in a developing tank 74 in the processor section 72, and the printing paper P is immersed in the development solution so as to effect development processing. The printing paper P subjected to development processing is transported to a bleach-fixing tank 76 located adjacent to the developing tank 74. A bleach-fixing solution is stored in the bleach-fixing tank 76, and the printing paper P is immersed in the bleach-fixing solution to effect bleach processing and fixation processing. The printing paper P subjected to fixation processing is transported to a washing section 78 located adjacent to the bleach-fixing tank 76 and comprised of a plurality of washing tanks in which washing water is stored, and the printing paper P is immersed in the washing water in the washing tanks, so as to effect wash processing.

The printing paper P subjected to wash processing is transported to a drying section 80 located above the washing section 78. In the drying section 80, the printing paper P is exposed to warm drying air blown along the direction of arrows B from a chamber 82 disposed below the transporting passage of the printing paper P, thereby drying the printing paper P.

A transport passage 84 comprised of a plurality of rollers is disposed downstream of the drying section 80 in the traveling direction of the printing paper P. The printing paper P which is discharged from the drying section 80 upon completion of dry processing is nipped by these pairs of rollers and is discharged and stacked outside the printer processor 10.

Next, a description will be given of the operation in accordance with this embodiment.

As the pairs of transport rollers 162, 164, 166, and 168 which are rotatively driven by the motor 152 transport the negative film N, and is stopped during print-exposure to position the negative film N.

Further, when the sensor calibration key is operated, the light-emitting elements of the sensors 172, 173, 174, 175, and 176 first emit light in response to a command from the controller 182. As the light from the light-emitting elements is received by the respective light-receiving elements, a determination is made as to whether or not the negative film N is present over the sensors 172, 173, 174, 175, and 176. If the negative film N is present, the operation of the motor 152 is controlled such that the negative film N is discharged from over the sensors 172, 173, 174, 175, and 176 by means of the pairs of transport rollers 162, 164, 166, and 168.

Then, after the negative film N is discharged, the light-emitting elements of the sensors 172, 173, 174, 175, and 176 emit light again in response to a command from the controller 182. As the light from the light-emitting elements is received by the respective light-receiving elements, a determination is made as to whether or not the sensitivities of the sensors 172, 173, 174, 175, and 176 fall within the predetermined ranges of values, respectively. If the sensitivities do not fall within the predetermined ranges of values, the sensitivities of the light-receiving elements, for example, are automatically corrected, and are made to fall within the respective predetermined ranges of values, thereby effecting the calibration of the sensors.

Meanwhile, when the sensor calibration key is operated, if it is determined by the sensors 172, 173, 174, 175, and 176 that the negative film N is not present over the sensors 172, 173, 174, 175, and 176, the controller 182 instantly calibrates the sensors 172, 173, 174, 175, and 176.

As a result, the sensors 172, 173, 174, 175, and 176 are prevented from being calibrated erroneously in a state in which the negative film N is present over the sensors 172, 173, 174, 175, and 176, thereby facilitating the calibration of the sensors.

On the other hand, after the negative carrier 30 is temporarily removed from the worktable 11, in a case where the negative carrier 30 is reinstalled on the worktable 11 so as to effect the transverse feeding of the negative film N as shown in FIG. 2, the connector of the printer processor 10 and the connector of the negative carrier 30 are electrically connected to each other, thereby supplying electric power to the negative carrier 30.

At this juncture, if it is detected by any one of the sensors 172, 173, 174, 175, and 176 that the negative film N is prevent over the sensors 172, 173, 174, 175, and 176, the controller 182 controls the operation of the motor 152 so that the motor 152 rotates for a fixed time duration. Hence, the negative film N is transported by the pairs of transport rollers 162, 164, 166, and 168 so as to discharge the negative film N from over the sensors 172, 173, 174, 175, and 176. Then, after the discharging of the negative film N, the controller 182 calibrates the sensors 172, 173, 174, 175, and 176.

Accordingly, in the same way as described above, the sensors 172, 173, 174, 175, and 176 are prevented from being calibrated erroneously in a state in which the negative film N is present over the sensors 172, 173, 174, 175, and 176, thereby facilitating the calibration of the sensors.

Then, as shown in FIGS. 6 and 7, if the operator inserts the negative film N into a nip between the first pair of transport rollers 162, and presses the start key, the motor 152 rotates such that the pairs of transport rollers 162, 164, 166, and 168 transports the negative film N to the right-hand side in the drawings. As a result, the pairs of transport rollers 162, 164, 166, and 168 which are rotatively driven by the motor 152 transport the negative film N while nipping the same, and are stopped at the time of print-exposure to position the negative film N.

Meanwhile, in the case where the direction in which the negative carrier 30 is installed with respect to the printer processor 10 is changed as shown in FIG. 3, and the longitudinal feeding system is adopted, the calibration of the sensors is also effected in the same way as described above. Subsequently, the pairs of transport rollers 162, 164, 166, and 168 transport the negative film N while nipping the same, and are stopped at the time of print-exposure to position the negative film N.

It should be noted that although, in the above-described embodiment, the controller 182 is used as a controlling device, a device such as a computer may be used specifically. In addition, although transmission-type sensors are used as the sensors, reflection-type sensors may be used.

Furthermore, although, in the above-described embodiment, the sensors 172, 173, 174, 175, and 176 are respectively calibrated at the time of operation of the sensor calibration key and at the reinstallation of the negative carrier 30 on the worktable 11, one or more of these sensors 172, 173, 174, 175, and 176 may be selectively calibrated, or sensor calibration keys corresponding to the sensors 172, 173, 174, 175, and 176 may be respectively provided.

In addition, although, in the above-described embodiment, a description has been given of a case where the negative film N is fed transversely and a case where it is fed longitudinally by using the identical negative carrier 30, it goes without saying that the present invention is applicable in a case where the negative carrier 30 is replaced by another type of negative carrier.

What is claimed is:

1. A negative carrier for a photographic printer, which is installed on a photographic printer for print-exposing an image on a negative film onto a photosensitive material, and which effects the positioning of the negative film during print-exposure of the photosensitive material, comprising:

a sensor disposed in a transporting passage of the negative film so as to detect information concerning the negative film; and a controlling device for determining one of the presence and absence of the negative film over said sensor on the basis of a detection signal from said sensor, and for calibrating said sensor if it is determined that the negative film is absent.

2. A negative carrier for a photographic printer according to claim 1, further comprising:
a transporting device for transporting the negative film.

3. A negative carrier for a photographic printer according to claim 2, wherein, upon determining that the negative film is present over said sensor, said controlling device controls said transporting device so as to discharge the negative film from over said sensor, and calibrates said sensor after the discharge of the negative film.

4. A negative carrier for a photographic printer according to claim 3, wherein when said negative carrier is electrically connected to the photographic printer and is installed on the photographic printer, said controlling device determines one of the presence and absence of the negative film, and, upon determining that the negative film is present over said sensor, provides said control to said transporting device and effects the calibration of said sensor.

5. A negative carrier for a photographic printer according to claim 2, wherein said transporting device has a transport roller, and said transport roller is disposed in the transporting passage of the negative film in such a manner as to be rotatable.

6. A negative carrier for a photographic printer according to claim 5, wherein said transporting device has a driving device, and said driving device drives said transport roller.

7. A negative carrier for a photographic printer according to claim 6, wherein said driving device has a driving source and an endless elongated member, and said driving source imparts a driving force to said transport roller by means of said endless elongated member.

8. A negative carrier for a photographic printer according to claim 5, wherein at least one pair of transport rollers is provided as said transport roller, and said at least one pair of transport rollers nips the negative film in a thicknesswise direction thereof and transports the negative film.

9. A negative carrier for a photographic printer according to claim 1, wherein when said negative carrier is electrically connected to the photographic printer and is installed on the photographic printer, said controlling device determines one of the presence and absence of the negative film, and, upon determining that the negative film is absent over said sensor, effects the calibration of said sensor.

10. A negative carrier for a photographic printer, which is installed on a photographic printer for print-exposing an image on a negative film onto a photosensitive material, and which effects the positioning of the negative film during print-exposure of the photosensitive material, comprising:
a transporting device for transporting the negative film;
a sensor disposed in a transporting passage of the negative film so as to detect information concerning the negative film; and
a controlling device which determines one of the presence and absence of the negative film over said sensor on the basis of a detection signal from said sensor and, upon determining that the negative film is absent, calibrates said sensor, whereas, upon determining that the negative film is present, said controlling device controls said transporting device so as to discharge the negative film from over said sensor, and calibrates said sensor after the discharge of the negative film.

11. A negative carrier for a photographic printer according to claim 10, wherein when said negative carrier is electrically connected to the photographic printer and is installed on the photographic printer, said controlling device, upon determining that the negative film is present over said sensor, provides said control to said transporting device and effects the calibration of said sensor.

12. A negative carrier for a photographic printer according to claim 10, wherein when said negative carrier is electrically connected to the photographic printer and is installed on the photographic printer, said controlling device, upon determining that the negative film is absent over said sensor, effects the calibration of said sensor.

13. A negative carrier for a photographic printer according to claim 10, wherein said transporting device has a transport roller and a driving device, and said transport roller is disposed in the transporting passage of the negative film in such a manner as to be rotatable, and transports the negative film by a driving force of said driving device.

14. A negative carrier for a photographic printer according to claim 13, wherein said driving device has a driving source and an endless elongated member, and said driving source imparts the driving force to said transport roller by means of said endless elongated member.

15. A negative carrier for a photographic printer according to claim 13, wherein at least one pair of transport rollers is provided as said transport roller, and said at least one pair of transport rollers nips the negative film in a thicknesswise direction thereof and transports the negative film.

16. A negative carrier for a photographic printer, which is installed on a photographic printer for print-exposing an image on a negative film onto a photosensitive material, and which effects the positioning of the negative film during print-exposure of the photosensitive material, comprising:
a transport roller disposed in a transporting passage of the negative film in such a manner as to be rotatable so as to transport the negative film;
a driving device for driving said transport roller;
a sensor disposed in the transporting passage of the negative film so as to detect information concerning the negative film; and
a controlling device which, when said negative carrier is electrically connected to the photographic printer and is installed on the photographic printer, determines one of the presence and absence of the negative film over said sensor on the basis of a detection signal from said sensor and, upon determining that the negative film is absent, calibrates said sensor, whereas, upon determining that the negative film is present, said controlling device controls said driving device so as to discharge the negative film from over said sensor by means of said transport roller, and calibrates said sensor after the discharge of the negative film.

17. A negative carrier for a photographic printer according to claim 16, wherein said driving device has a driving source and an endless elongated member, and said driving source imparts a driving force to said transport roller by means of said endless elongated member.

18. A negative carrier for a photographic printer according to claim 16, wherein at least one pair of transport rollers is provided as said transport roller, and said at least one pair of transport rollers nips the negative film in a thicknesswise direction thereof and transports the negative film.

19. A negative carrier for a photographic printer according to claim 18, wherein one of said at least one pair of transport rollers is a drive roller which obtains its driving force from said driving device.

20. A negative carrier for a photographic printer according to claim 16, wherein said transport roller has an abutment portion, and said abutment portion is provided in such a manner as to be brought into contact with portions of the negative film which are close to transverse ends of the negative film.

* * * * *